(12) United States Patent
Sekizawa et al.

(10) Patent No.: US 10,872,440 B2
(45) Date of Patent: Dec. 22, 2020

(54) IMAGE SIGNAL PROCESSING DEVICE, AND IMAGE SIGNAL TRANSMISSION SYSTEM

(71) Applicant: Panasonic Intellectual Property Management Co., Ltd., Osaka (JP)

(72) Inventors: Masaru Sekizawa, Osaka (JP); Takaaki Abe, Osaka (JP); Ryoji Okubo, Osaka (JP); Kazuma Tani, Osaka (JP); Iori Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 16/024,929

(22) Filed: Jul. 2, 2018

(65) Prior Publication Data

US 2019/0012810 A1 Jan. 10, 2019

(30) Foreign Application Priority Data

Jul. 10, 2017 (JP) .................................. 2017-134843

(51) Int. Cl.
*G06F 9/00* (2006.01)
*H04L 12/707* (2013.01)
(Continued)

(52) U.S. Cl.
CPC .................. *G06T 9/00* (2013.01); *G06F 3/14* (2013.01); *G09G 3/36* (2013.01); *G09G 5/14* (2013.01);
(Continued)

(58) Field of Classification Search
CPC ..................... G09G 2340/12; G09G 2370/045
See application file for complete search history.

(56) References Cited

U.S. PATENT DOCUMENTS 4,821,119 A * 4/1989 Gharavi ............... H04N 19/129
 375/240
5,903,261 A * 5/1999 Walsh .................... G09G 5/397
 345/418

(Continued)

FOREIGN PATENT DOCUMENTS

JP 62-008658 1/1987
JP 2002-369143 12/2002
(Continued)

*Primary Examiner* — Ming Wu
(74) *Attorney, Agent, or Firm* — Wenderoth, Lind & Ponack, L.L.P.

(57) ABSTRACT

An image signal processing device receives image signals from source devices and outputs image signals via a plurality of communication paths. The image signal processing device includes a plurality of compression circuits, a transmission circuit and a path/compression-rate setting circuit. The plurality of compression circuits compress image signals to be transmitted via the plurality of communication paths. The transmission circuit outputs the image signals compressed. The path/compression-rate setting circuit, based on each data amount of the image signals received, determines a communication path for transmitting a part or the whole of each of the image signal, and sets a common compression rate for all of the plurality of compression circuits. The path/compression-rate setting circuit divides an image signal having a relatively large data amount, and assigns a part of the divided image signal to a communication path for transmitting an image signal having a relatively small data amount.

8 Claims, 11 Drawing Sheets

(51) Int. Cl.
*G09G 3/36* (2006.01)
*H04L 29/06* (2006.01)
*G06F 3/14* (2006.01)
*G09G 5/14* (2006.01)
*G06T 9/00* (2006.01)

(52) U.S. Cl.
CPC .............. *H04L 45/24* (2013.01); *H04L 69/04* (2013.01); *H04L 69/14* (2013.01); *G09G 2350/00* (2013.01); *G09G 2352/00* (2013.01); *G09G 2370/20* (2013.01)

(56) References Cited

U.S. PATENT DOCUMENTS

| | | | | |
|---|---|---|---|---|
| 6,674,538 | B2 * | 1/2004 | Takahashi | G11B 15/087 358/1.13 |
| 2003/0005189 | A1 * | 1/2003 | Wilson | G06F 13/387 710/33 |
| 2008/0129648 | A1 | 6/2008 | Hagiwara et al. | |
| 2009/0259856 | A1 * | 10/2009 | Tsuruta | G06F 21/52 713/189 |
| 2010/0106692 | A1 * | 4/2010 | Moloney | H03M 7/3066 707/693 |
| 2010/0296745 | A1 * | 11/2010 | Strom | H04N 19/162 382/233 |
| 2011/0123127 | A1 * | 5/2011 | Mima | H04N 19/46 382/239 |
| 2012/0182388 | A1 * | 7/2012 | Lim, II | H04N 19/597 348/43 |
| 2015/0188632 | A1 * | 7/2015 | Aoyama | H04B 10/116 398/118 |
| 2015/0293700 | A1 * | 10/2015 | Sasaki | G06F 16/00 711/113 |

FOREIGN PATENT DOCUMENTS

| | | |
|---|---|---|
| JP | 2011-035863 | 2/2011 |
| JP | 2014-168121 | 9/2014 |
| WO | 2006/072985 | 7/2006 |

* cited by examiner

IMAGE SIGNAL PROCESSING DEVICE, AND IMAGE SIGNAL TRANSMISSION SYSTEM

BACKGROUND

1. Field of the Invention

The present disclosure relates to an image signal processing device for transmitting, via a network, a plurality of image signals having been received from a plurality of source devices. The present disclosure relates to an image signal transmission system including such an image signal processing device as a transmission device, and further including a receiving device for sending, to a display device, the image signals having been received from the transmission device.

2. Description of the Related Art

An image display system is provided which combines a plurality of image signals having been received from a plurality of source devices and displays a plurality of windows corresponding to the plurality of image signals on the screen of one display device.

In such an image display system, the source devices and the display device are disposed remotely from each other via a network of a limited band. When an image signal is transmitted via the network, the image signal needs to be compressed. Examples of the compression method of the image signal are disclosed in Patent Literature 1 (International Patent Publication No. 2006/072985) and Patent Literature 2 (Unexamined Japanese Patent Publication No. S62-008658).

Patent Literature 1 discloses an image display device that can display a plurality of digital images on the same display screen by making windows for displaying digital images overlap each other. This image display device manages the windows including visible region information using a window management table, and, before image decompression processing, cuts out only compressed image data of the visible region. Then, image decompression is performed. Thus, the load of the image decompression processing is reduced.

Patent Literature 2 discloses a method including the following steps:
  inputting division information used for dividing an input image signal into an important portion on a screen and the other portion;
  encoding the important portion without data compression or using a method of performing data compression of a small distortion; and
  encoding the other portion by a method of a high compression rate. Thus, a data compression method is achieved in which the image quality of the whole image is high and the data compression rate is high.

SUMMARY

In an image display system where source devices and a display device are disposed remotely from each other via a network, the following problems occur when an image signal is compressed and transmitted.

When a plurality of image signals having different data amounts are transmitted via a network of a limited band, disadvantageously, compressing the plurality of image signals at the same compression rate with reference to the image signal having the largest data amount further degrades the image quality of image signals having smaller data amounts. Furthermore, when a plurality of image signals having different data amounts are transmitted via a network of a limited band, compressing the plurality of image signals at the compression rate changed in accordance with the data amounts of the image signals received from the source devices causes the following problem:
  when the plurality of images are displayed in an overlapping state, the image quality changes on the boundary in which a plurality of images overlap each other.

The present disclosure provides an image signal processing device that transmits a plurality of image signals having different data amounts via a network of a limited band. The image signal processing device suppresses the degradation of the images on a screen and the reduction in real time performance. The present disclosure further provides a transmission system that includes such an image signal processing device as a transmission device and further includes a receiving device connected to a display device. The transmission system transmits image signals from the transmission device to the receiving device.

A first aspect of the present disclosure provides an image signal processing device that receives image signals from a plurality of source devices and outputs image signals via a plurality of communication paths. The image signal processing device includes the following components:
  a plurality of compression circuits for compressing image signals to be transmitted via the plurality of communication paths;
  a transmission circuit for outputting the image signals compressed by the plurality of compression circuits via the plurality of communication paths corresponding to the plurality of compression circuits; and
  a path/compression-rate setting circuit that, based on each data amount of the image signals received from the plurality of source devices, determines a communication path for transmitting a part or the whole of each of the image signal, of the plurality of communication paths, and sets a common compression rate for all of the plurality of compression circuits.

The path/compression-rate setting circuit divides an image signal having a relatively large data amount out of the image signals, and assigns a part of the divided image signal to a communication path for transmitting an image signal having a relatively small data amount out of the image signals, of the plurality of communication paths.

A second aspect of the present disclosure provides an image signal transmission system. The image signal transmission system includes the above-mentioned image signal processing device and a receiving device. The receiving device receives the image signals from the image signal processing device via a network, generates a combined image based on the received image signals, and transmits an image signal indicating the combined image to a display device. The receiving device includes the following components:
  a receiving circuit for receiving the image signals from the transmission circuit of the image signal processing device via the plurality of communication paths;
  decompression circuits for decompressing the received image signals; and
  an image combining circuit for combining images indicated by the decompressed image signals.

When the decompressed image signals include parts of the image signal divided by the path/compression-rate setting circuit, the image combining circuit combines the parts back to the image signal, and combines the images using the combined image signal.

The present disclosure can provide an image signal transmission system that suppresses the degradation of images on a screen and the reduction in real time performance.

DETAILED DESCRIPTION OF THE PREFERRED EMBODIMENTS

Hereinafter, exemplary embodiments are described in detail appropriately with reference to the accompanying drawings. Here, unnecessarily detailed descriptions are sometimes omitted. For example, the detailed descriptions of well-known items or the redundant descriptions of substantially the same configuration are sometimes omitted. The objective of the omission is to avoid unnecessarily redundancy of the following descriptions and to allow persons skilled in the art to easily understand the present disclosure. The inventors provide the accompanying drawings and the following descriptions to allow the persons skilled in the art to sufficiently understand the present disclosure. The drawings and descriptions are not intended to restrict the subjects described in the claims.

Exemplary Embodiment

[1. Configuration]

Figure 1:
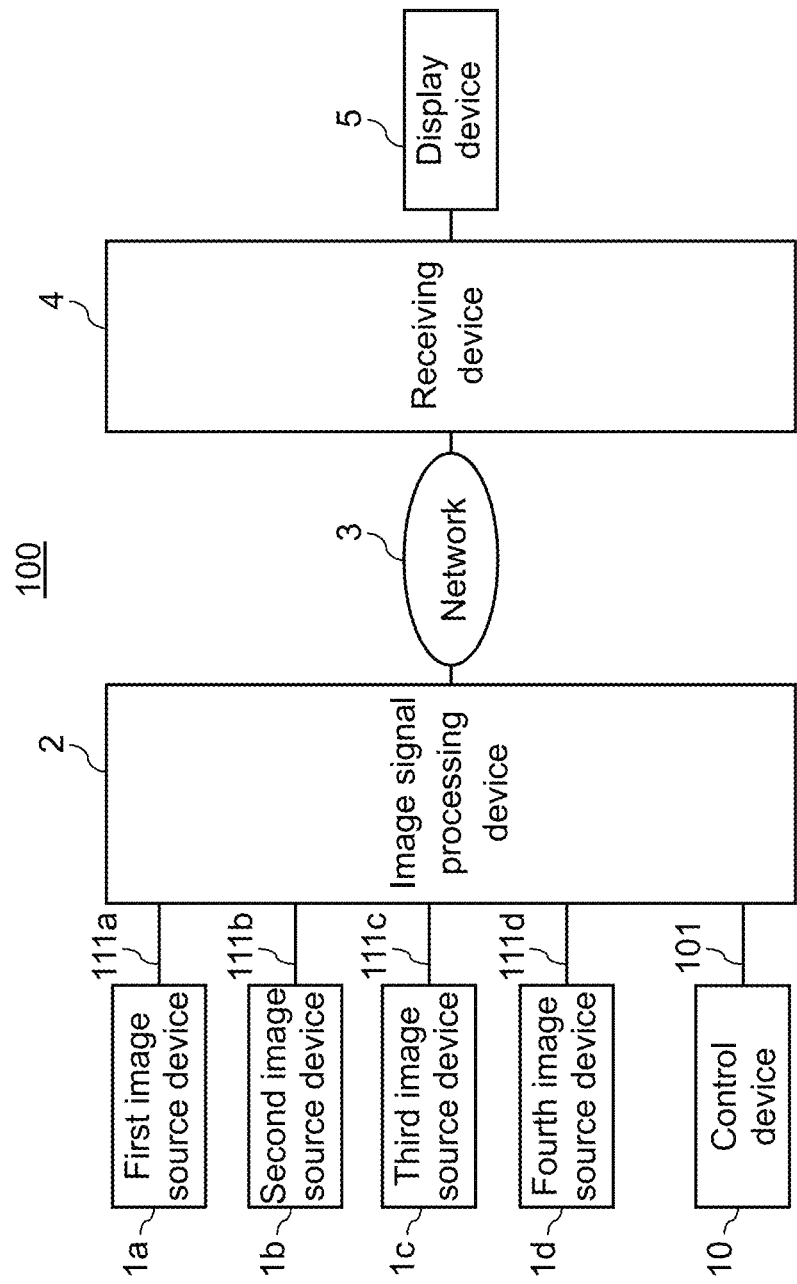
FIG. 1 is a diagram showing the whole configuration of an image signal transmission system in accordance with an exemplary embodiment.
Figure 2:
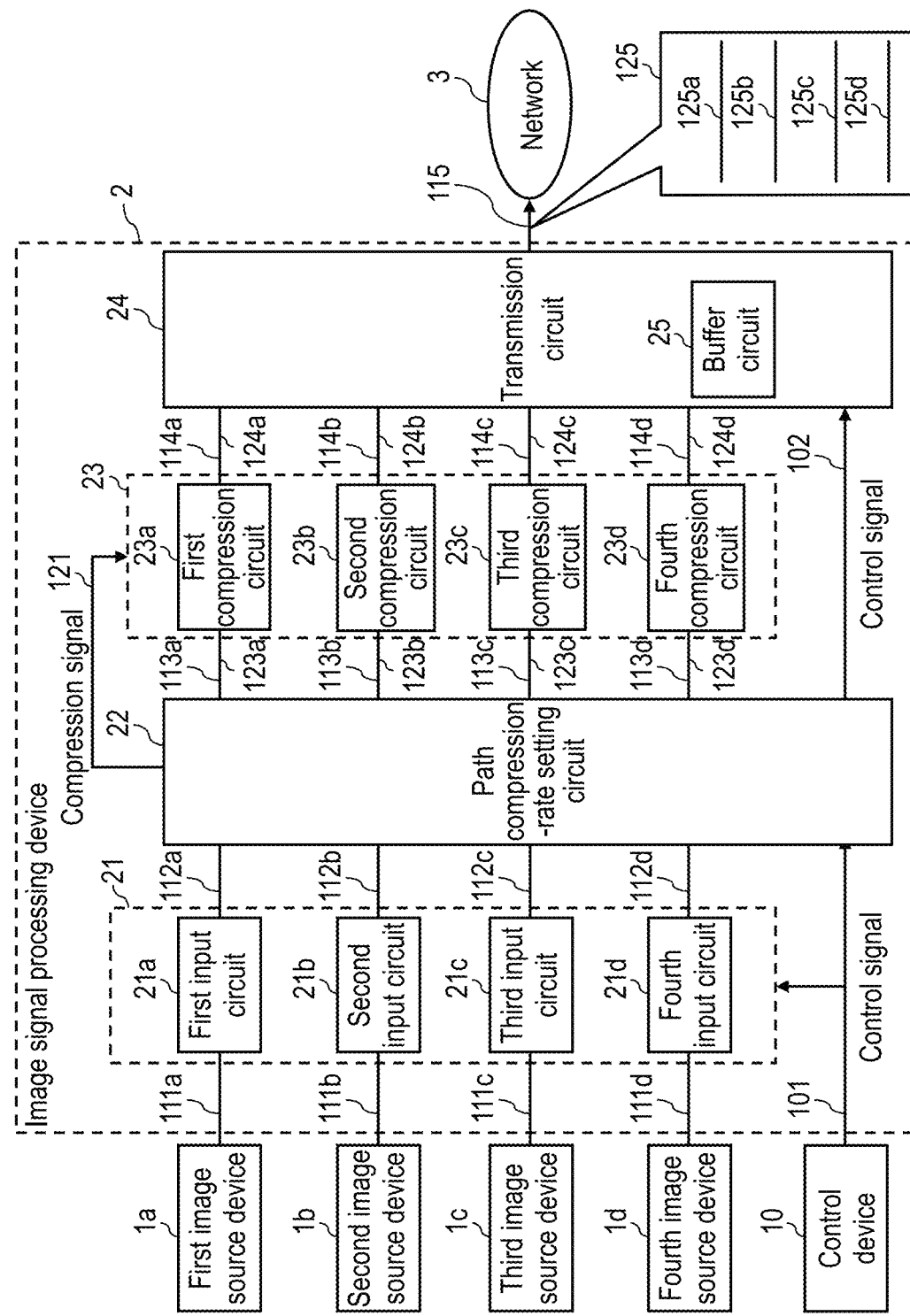
FIG. 2 is a diagram showing a specific configuration of an image signal processing device in the image signal transmission system.
Figure 3:
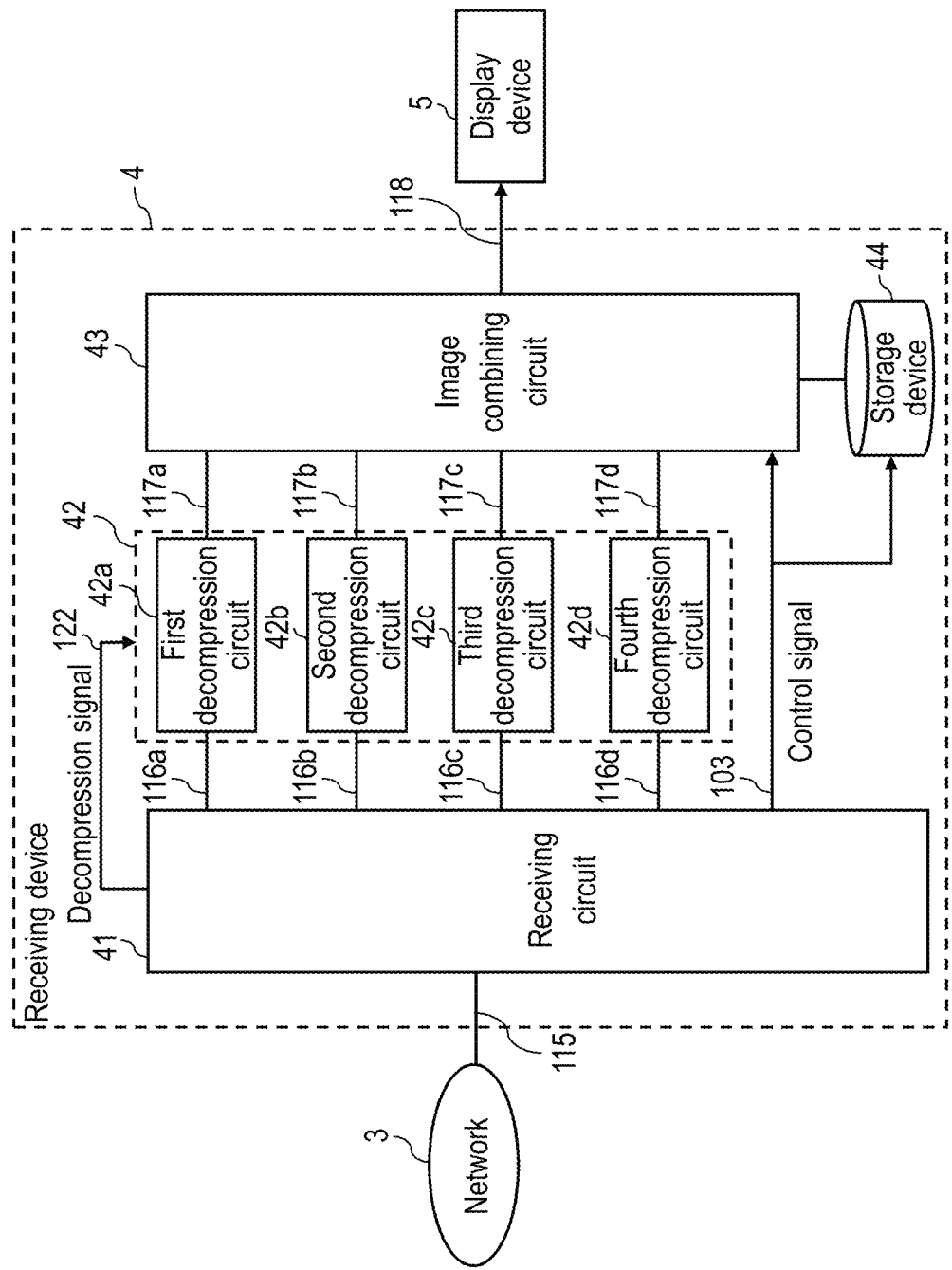
FIG. 3 is a diagram showing a specific configuration of a receiving device in the image signal transmission system.

An image signal transmission system of the disclosure combines image signals input from a plurality of source devices and transmits them to a display device. FIG. 1 to FIG. 3 are block diagrams showing the configuration of the image signal transmission system in accordance with an exemplary embodiment.

FIG. 1 is a block diagram showing the whole configuration of the image signal transmission system. As shown in FIG. 1, image signal transmission system 100 includes the following components:

image signal processing device 2 (transmission device) for receiving image signals from a plurality of source devices (for example, first to fourth image source devices 1a to 1d), and compressing and outputting them;

receiving device 4 for receiving, via network 3, the image signals output from image signal processing device 2, decompressing, combining, and outputting them to display device 5; and control device 10 for outputting control signal 101 to image signal processing device 2.

FIG. 2 is a diagram showing a detailed configuration of image signal processing device 2. Image signal processing device 2 serves as a transmission device for transmitting the image signals to receiving device 4 via network 3. As shown in FIG. 2, image signal processing device 2 includes: input circuits 21 (first to fourth input circuits 21a to 21d); path/compression-rate setting circuit 22; compression circuits 23 (first to fourth compression circuits 23a to 23d); and transmission circuit 24.

Path/compression-rate setting circuit 22 is connected to first to fourth compression circuits 23a to 23d via first to fourth transmission paths 123a to 123d (collectively, sometimes called transmission path 123), respectively. As the paths for transmitting the image signals compressed by first to fourth compression circuits 23a to 23d, first to fourth communication paths 125a to 125d (collectively, sometimes called communication path 125) are set. Transmission circuit 24 receives the image signals from first to fourth compression circuits 23a to 23d via respective first to fourth transmission paths 124a to 124d, and transmits them to network 3 via respective first to fourth communication paths 125a to 125d. In other words, first to fourth compression circuits 23a to 23d are circuits for compressing the image signals that are to be transmitted via first to fourth communication paths 125a to 125d.

FIG. 3 is a diagram showing a detailed configuration of receiving device 4. As shown in FIG. 3, receiving device 4 includes receiving circuit 41, decompression circuits 42 (first to fourth decompression circuits 42a to 42d), image combining circuit 43, and storage device 44.

First to fourth image source devices 1a to 1d are devices for outputting image signals, and include a Blu-ray (trademark) disc player, hard disk recorder, tuner, personal computer, and camera, for example. First to fourth image source devices 1a to 1d send image signals 111a to 111d to image signal processing device 2. Image signals 111a to 111d are sent in various formats (for example, XGA, HD, and 4K). Image signals 111a to 111d include moving image data or still image data. The image signals transmitted from the plurality of source devices may include only image signals showing moving images, may include only image signals showing still images, or may be a combination of image signals showing moving images and image signals showing still images.

Display device 5 is formed of a liquid crystal display and an organic electroluminescence (EL) display. Display device 5 may be a single display device, or may be a combination of a plurality of display devices. A combination of a plurality of display devices can form a larger screen.

Control device 10 includes: an input device used by a user for inputting a combining condition that indicates the positions and overlapping of a plurality of windows when a plurality of windows are displayed on the screen of display device 5; and a display device for displaying the input combining condition. Control device 10 is formed of, for example, a personal computer, a tablet-type computer, or a personal digital assistant. Via the input device of control device 10, a user can set a combining condition for specifying the expansion, reduction, and positions of windows to be displayed on display device 5, and the overlap between the windows. Control device 10 outputs control signal 101 that indicates the combining condition set by the user. Control device 10 supplies, to image signal processing device 2, control signal 101 including the following combining conditions, for example.

(1) Number of pixels of input images
(2) Expansion rate, reduction rate, scombining method of image

[2. Operation]

The operation of image signal transmission system 100 having such a configuration is hereinafter described.

[2-1. Overall Operation]

Image signal transmission system 100 receives image data from first to fourth image source devices 1a to 1d, combines the plurality of received image data, and transmits the combined image data to display device 5. Specifically, in image signal transmission system 100, image signal processing device 2 receives image data from first to fourth image source devices 1a to 1d using first to fourth input circuits 21a to 21d, and compresses the image data using first to fourth compression circuits 23a to 23d. Transmission circuit 24 transmits the image data compressed by each compression circuit 23 to receiving device 4 via network 3. Receiving device 4 decompresses the plurality of image data received by receiving circuit 41 via network 3 using first to fourth decompression circuits 42a to 42d, combines the image data using image combining circuit 43, and makes display device 5 display the combined image data.

Figure 4:
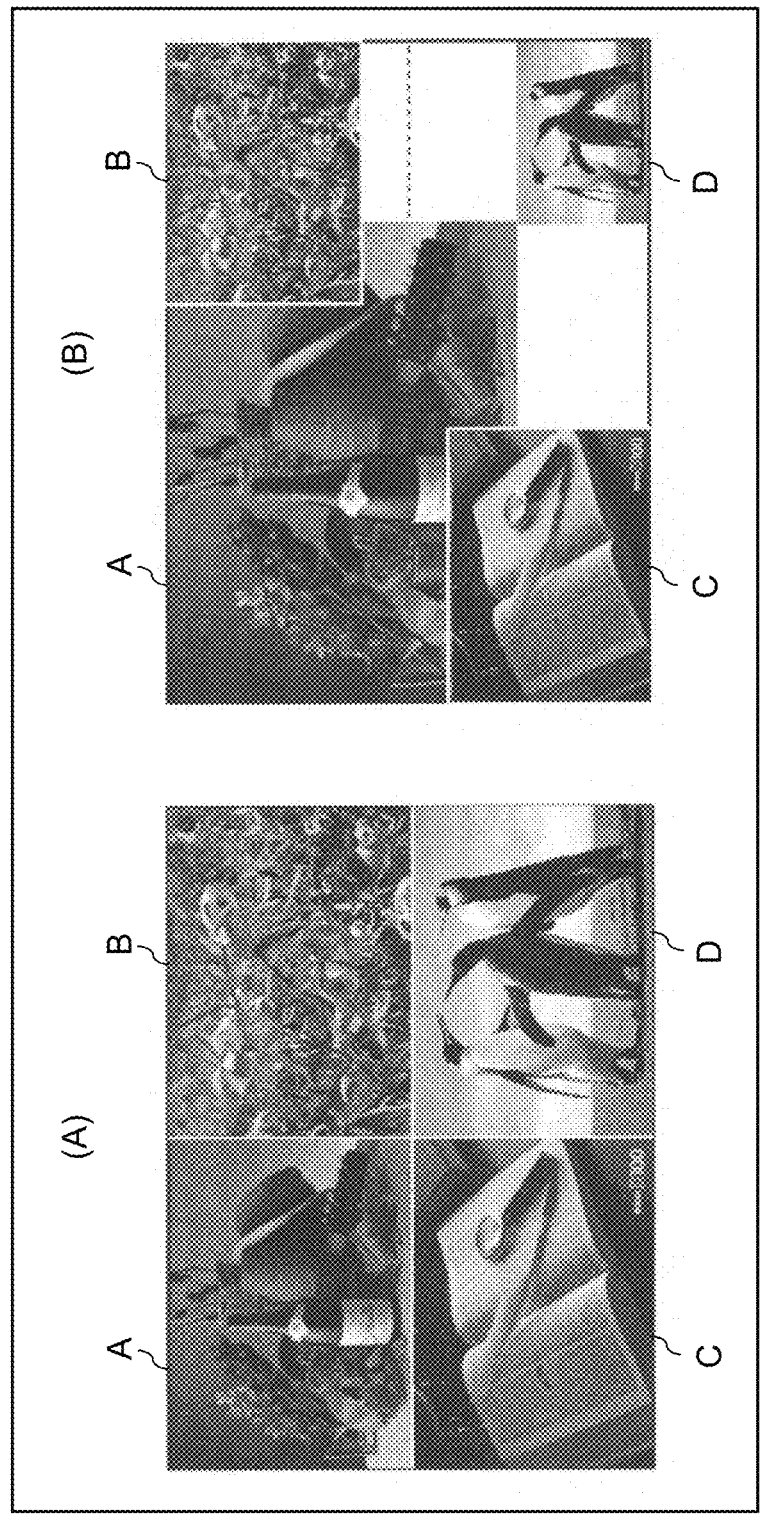
FIG. 4 is a diagram showing a display example of images displayed on a display device on the basis of image signals transmitted from the image signal transmission system.

FIG. 4 is a diagram showing display examples of images (windows) that are transmitted from image signal transmission system 100 and are displayed on display device 5. Image signal transmission system 100 combines windows "A to D" corresponding to image signals input from four first to fourth image source devices 1a to 1d, and makes display device 5 display the combined windows, as shown in (A) or (B) of FIG. 4.

The processing returns to FIG. 1 to FIG. 3. In image signal processing device 2, first to fourth input circuits 21a to 21d receive image signals 111a to 111d from first to fourth image source devices 1a to 1d, and output, to path/compression-rate setting circuit 22, image signals 112a to 112d corresponding to the windows displayed on display device 5. Here, the image signals having been input into first to fourth input circuits 21a to 21d are essentially sent to first to fourth compression circuits 23a to 23d via first to fourth transmission paths 123a to 123d. The image signals having been compressed by first to fourth compression circuits 23a to 23d are transmitted to receiving device 4 via first to fourth communication paths 125a to 125d.

Image signals 112a to 112d produce windows displayed by display device 5. The image shown by each window is an image that is generated by applying processing such as expansion, reduction, and overlapping to image signals 112a to 112d in accordance with control signal 101 from control device 10. In the following descriptions, the percentage of the display surface area occupied by the window corresponding to each of image signals 112a to 112d in the whole display region of display device 5 is referred to as "screen's occupancy".

Each input image signal is transmitted to corresponding compression circuit 23 via one transmission path. For example, the image signal having been input from first image source device 1a is transmitted to first compression circuit 23a via first transmission path 123a. Similarly, the image signals having been input from second to fourth image source devices 1b to 1d are transmitted to second to fourth compression circuits 23b to 23d via second to fourth transmission paths 123b to 123d, respectively. The image signals having been compressed by first to fourth compression circuits 23a to 23d are transmitted to receiving device 4 via first to fourth communication paths 125a to 125d.

In the present exemplary embodiment, when there is an unbalance in data amounts in communication paths 125a to 125d, the following processes are performed in order to reduce the unbalance:

an image signal (image data) having a large amount is divided; and communication paths 125a to 125d (namely, transmission paths 123a to 123d) for transmitting the divided image signals is set for the divided image signals. For this purpose, path/compression-rate setting circuit 22 performs the following steps:

determining a screen's occupancy by the window corresponding to each image signal;

when the screen's occupancies are unbalanced, dividing the image signal (image data) having a high screen's occupancy; and assigning and transmitting the divided image signals to the plurality of communication paths (namely, transmission paths).

Furthermore, path/compression-rate setting circuit 22 sets compression rates for the image signals on the basis of the state of the image signals after the assignment.

Specifically, path/compression-rate setting circuit 22 detects an image signal having a relatively high screen's occupancy, and an image signal having a relatively low screen's occupancy. For example, as the image signal having the relatively high screen's occupancy, path/compression-rate setting circuit 22 detects the image signal having the highest screen's occupancy, of the input image signals. Furthermore, as the image signal having the relatively low screen's occupancy, path/compression-rate setting circuit 22 detects the image signal having the lowest screen's occupancy, of the input image signals. Then, path/compression-rate setting circuit 22 outputs some blocks of the image data of the image signal having the relatively high screen's occupancy to the original communication path (transmission path) of the image signal. Furthermore, path/compression-rate setting circuit 22 assigns the remaining blocks, which are obtained by removing the some blocks from the image data indicated by the image signal having the relatively high screen's occupancy, to the communication path (transmission path) for the image signal having the relatively low screen's occupancy. Thus, only data of the some blocks is output to the communication path (transmission path) for the image signal having the relatively high screen's occupancy. While, to the communication path (transmission path) for the image signal having the relatively low screen's occupancy, data of the image signal having the relatively low screen's occupancy and data of the remaining blocks of the image signal having the relatively low screen's occupancy are output. Thus, path/compression-rate setting circuit 22 assigns and transmits an image signal having a high screen's occupancy to a plurality of communication paths.

For example, regarding four input image signals 112a to 112d, the case is considered in which the image signal having the highest screen's occupancy is image signal 112a, and the image signal having the lowest screen's occupancy is image signal 112d. In this case, path/compression-rate setting circuit 22 assigns the image signal related to some blocks in image signal 112a to first communication path 125a (namely, first transmission path 123a). Simultaneously, path/compression-rate setting circuit 22 assigns the image signal related to the remaining blocks in image signal 112a to fourth communication path 125d (namely, fourth transmission path 123d). Thus, image signal 112d and the image signal related to the remaining blocks in image signal 112a are output to fourth communication path 125d (namely, fourth transmission path 123d).

Path/compression-rate setting circuit 22 transmits, to transmission circuit 24, control signal 102 that includes the assignment information indicating the assignment state to communication paths 125 (or, transmission paths 123) and the information indicated by control signal 101. Furthermore, path/compression-rate setting circuit 22 outputs compression signal 121 indicating the compression rate set in accordance with image signals 113a to 113d after the assignment.

First to fourth compression circuits 23a to 23d are circuits for essentially compressing image signals 113a to 113d coming from first to fourth image source devices 1a to 1d. In accordance with compression signal 121, first to fourth compression circuits 23a to 23d compress image signals 113a to 113d to generate image signals 114a to 114d after compression, and transmit them to transmission circuit 24.

Transmission circuit 24 integrates image signals 114a to 114d after compression, compression signal 121, and control signal 102 into communication data 115, and transmits communication data 115 to receiving device 4 via network 3. Network 3 is a local area network (LAN) or a wide area network (WAN).

Transmission circuit 24 includes buffer circuit 25 for temporarily storing image signals, in order to synchronously transmit image signals 114a to 114d after compression.

Receiving circuit 41 of receiving device 4 shown in FIG. 3 receives communication data 115 via network 3. Receiving circuit 41 extracts, from received communication data 115, image signals 116a to 116d, decompression signal 122 for indicating the condition for decompression, and control signal 103 indicating the combining condition or the like of image signals. Receiving circuit 41 also outputs these signals to first to fourth decompression circuits 42a to 42d and image combining circuit 43. Decompression signal 122 includes information indicating the compression rate set by path/compression-rate setting circuit 22. Control signal 103 includes: the information (assignment information) for returning, to the state before assignment, the blocks used when the image data has been assigned and transmitted to a plurality of paths; and the information indicating the combining condition such as the positions and overlapping of the windows.

First to fourth decompression circuits 42a to 42d are circuits for decompressing the image signals compressed by first to fourth compression circuits 23a to 23d, respectively. First to fourth decompression circuits 42a to 42d decompress image signals 116a to 116d on the basis of the compression rate indicated by decompression signal 122 to generate image signals 117a to 117d after decompression, and transmit them to image combining circuit 43.

In accordance with the assignment information indicated by control signal 103, image combining circuit 43 returns image signals 117a to 117d after decompression to the state of the image signals before the path change by path/compression-rate setting circuit 22. Furthermore, image combining circuit 43 combines images indicated by the image signals in accordance with the combining condition indicated by control signal 103, generates image signal 118 for displaying a combined image, and transmits image signal 118 to display device 5.

Storage device 44 stores control signal 103 received by receiving circuit 41. The display state of display device 5 is kept until the assignment condition set by path/compression-rate setting circuit 22 is updated. Storage device 44 is formed of a recording medium such as a semiconductor memory, solid state drive (SSD), or hard disk drive (HDD).

In the above-mentioned operations, a plurality of windows corresponding to image signals 111a to 111d are displayed on the screen of display device 5 (see FIG. 4).

Here, problems addressed by image signal transmission system 100 of the present exemplary embodiment are described. In the following description, as shown in FIG. 5, the screen of display device 5 is divided into 64 (8×8) blocks, and the screen's occupancy for each block is determined.

Figure 5:
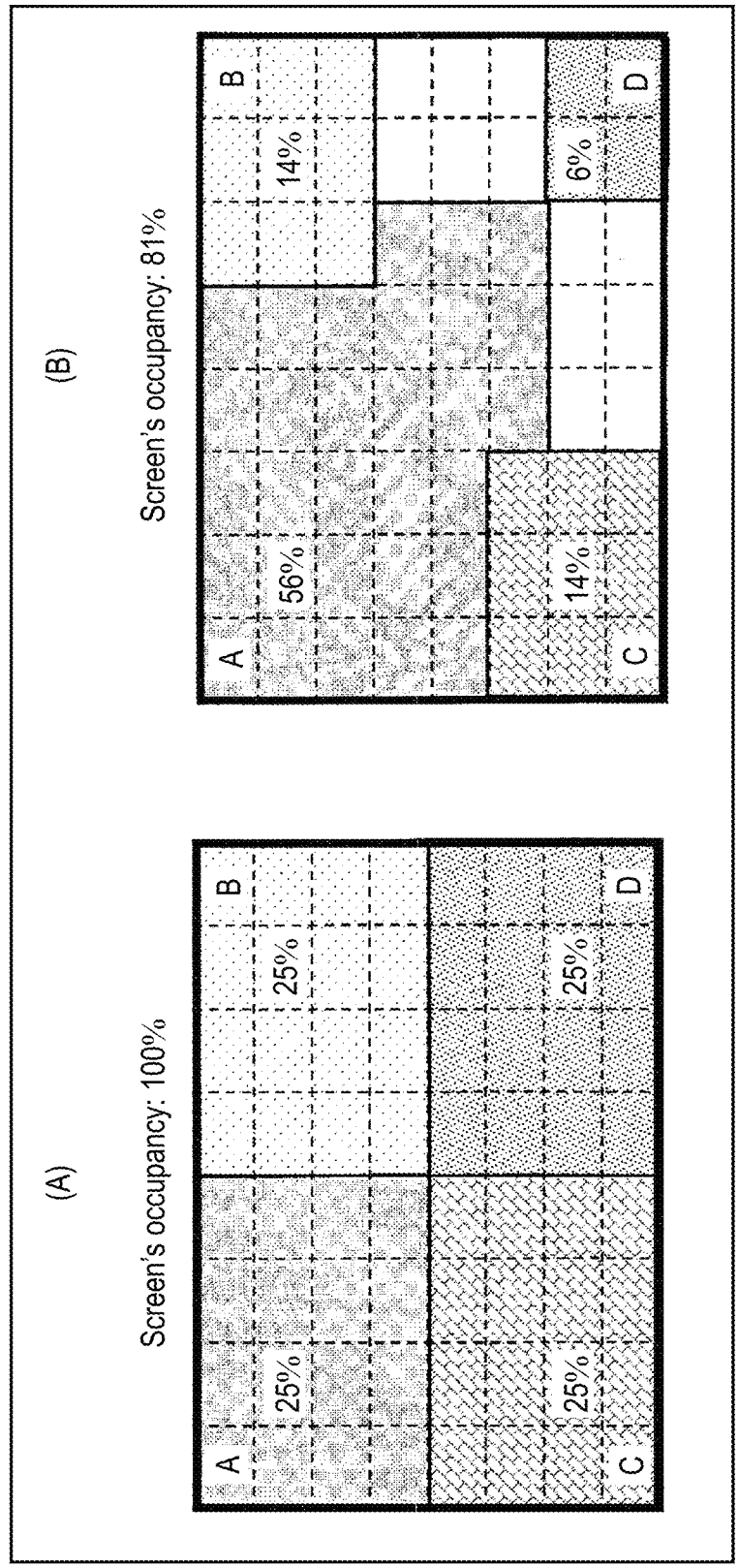
FIG. 5 is a diagram showing examples of the screen layout of a plurality of windows displayed on the display device.
Figure 6A:
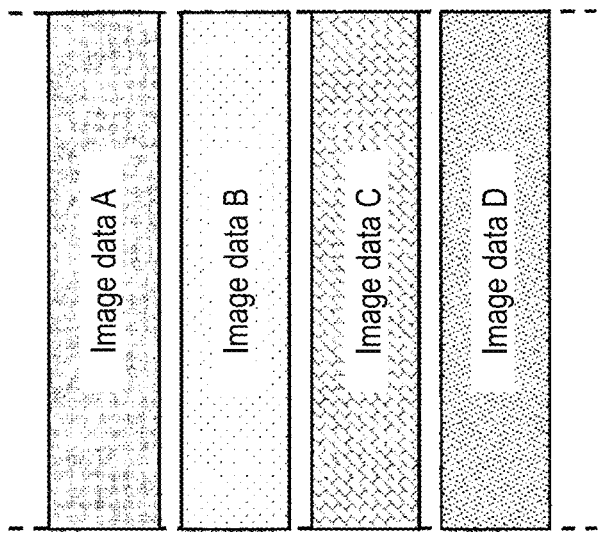
FIG. 6A is a diagram schematically showing the data amount of each input image signal.
Figure 6B:
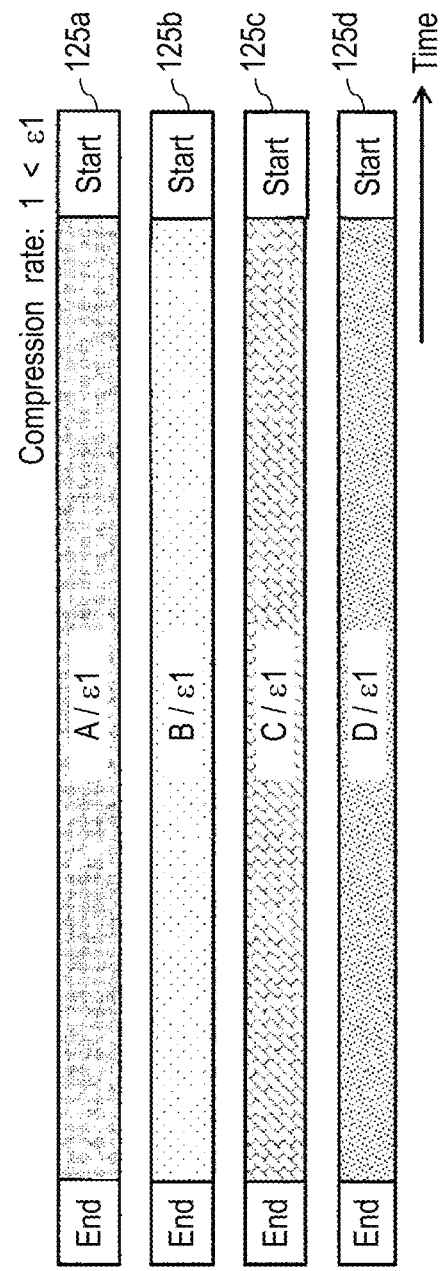
FIG. 6B is a diagram schematically showing the use rates of the image data transmitted via first to fourth communication paths.

Diagrams (A) and (B) of FIG. 5 show the examples of the window layouts shown in (A) and (B) of FIG. 4, and show the screen's occupancy by each window. In (A) and (B) of FIG. 5, windows A, B, C, and D correspond to the images indicated by image signals 111a, 111b, 111c, and 111d. FIG. 6A is a diagram schematically showing the data amounts of input image signals 112a to 112d in the case of (A) of FIG. 5. FIG. 6B is a diagram schematically showing the use rates of the image data transmitted through first to fourth communication paths 125a to 125d in the case of (A) of FIG. 5. Here, the use rate of data means the percentage of the data amount (namely, data amount processed by one compression circuit) transmitted through one communication path in the data amount of the whole screen.

In the example of (A) of FIG. 5, the amounts of the image data shown by image signals 112a to 112d are constant (see FIG. 6A), and windows "A to D" have an equal screen's occupancy. The whole screen has a surface area corresponding to 64 blocks, and each of windows "A to D" has a surface area corresponding to 16 blocks. The screen's occupancies by windows "A to D" are described below.

Screen's occupancy by window $A = 25\% (=16/64)$  (1a)

Screen's occupancy by window $B = 25\% (=16/64)$  (1b)

Screen's occupancy by window $C = 25\% (=16/64)$  (1c)

Screen's occupancy by window $D = 25\% (=16/64)$  (1d)

Each of the screen's occupancies by four windows is 25%, and the data amounts of four image data are not unbalanced. When there is no unbalance, the compression rate of each window can be set at same compression rate $\varepsilon 1$ as shown in FIG. 6B. Hereinafter, the compression rate set when there is no unbalance is referred to as "basic compression rate ε1". Since the images are compressed at the same compression rate, even when the images of a plurality of windows are displayed in an overlapping state on the same screen, the image quality does not change on the boundary in which images overlap each other.

While, (B) of FIG. 5 shows the example of a screen image when the screen's occupancies by windows are unbalanced. Window A has a surface area corresponding to 36 blocks, each of windows B and C has a surface area corresponding to 9 blocks, and window D has a surface area corresponding to 4 blocks. The screen's occupancies by windows "A to D" are described below.

$$\text{Screen's occupancy by window } A=56\%(=36/64) \quad (2a)$$

$$\text{Screen's occupancy by window } B=14\%(=9/64) \quad (2b)$$

$$\text{Screen's occupancy by window } C=14\%(=9/64) \quad (2c)$$

$$\text{Screen's occupancy by window } D=6\%(=4/64) \quad (2d)$$

Thus, there is an unbalance in data amounts of image data of windows "A to D". In the example of (A) of FIG. 5 having no unbalance in data amounts of image data, the screen's occupancy of the whole screen is 100%. In the example of (B) of FIG. 5 having an unbalance in data amounts of image data, however, the screen's occupancy is 81% (52 blocks/64 blocks).

Figure 7:
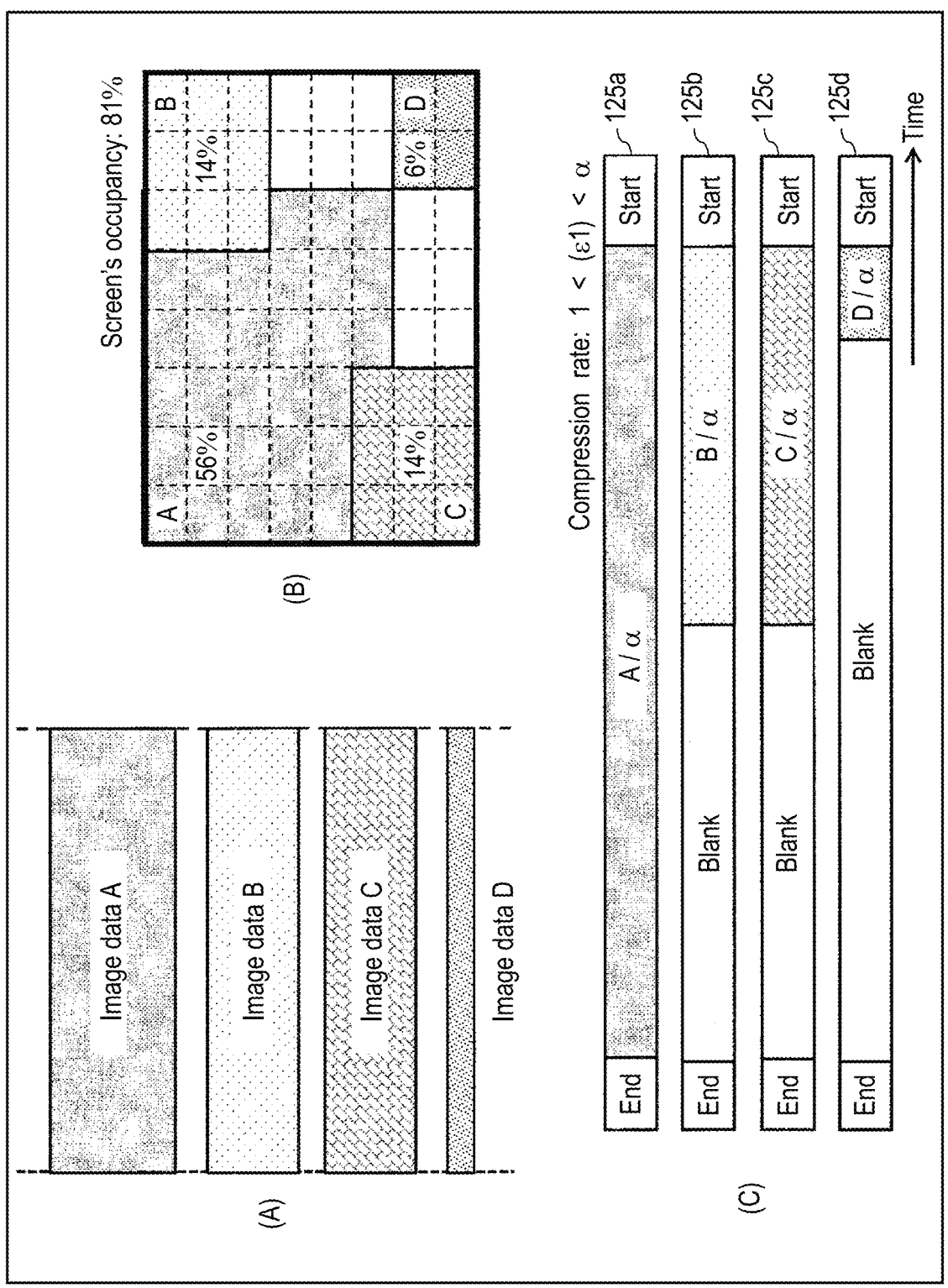
FIG. 7 is a diagram for describing the problem occurring when the compression rates of image signals are simply set at the same value.
Figure 8:
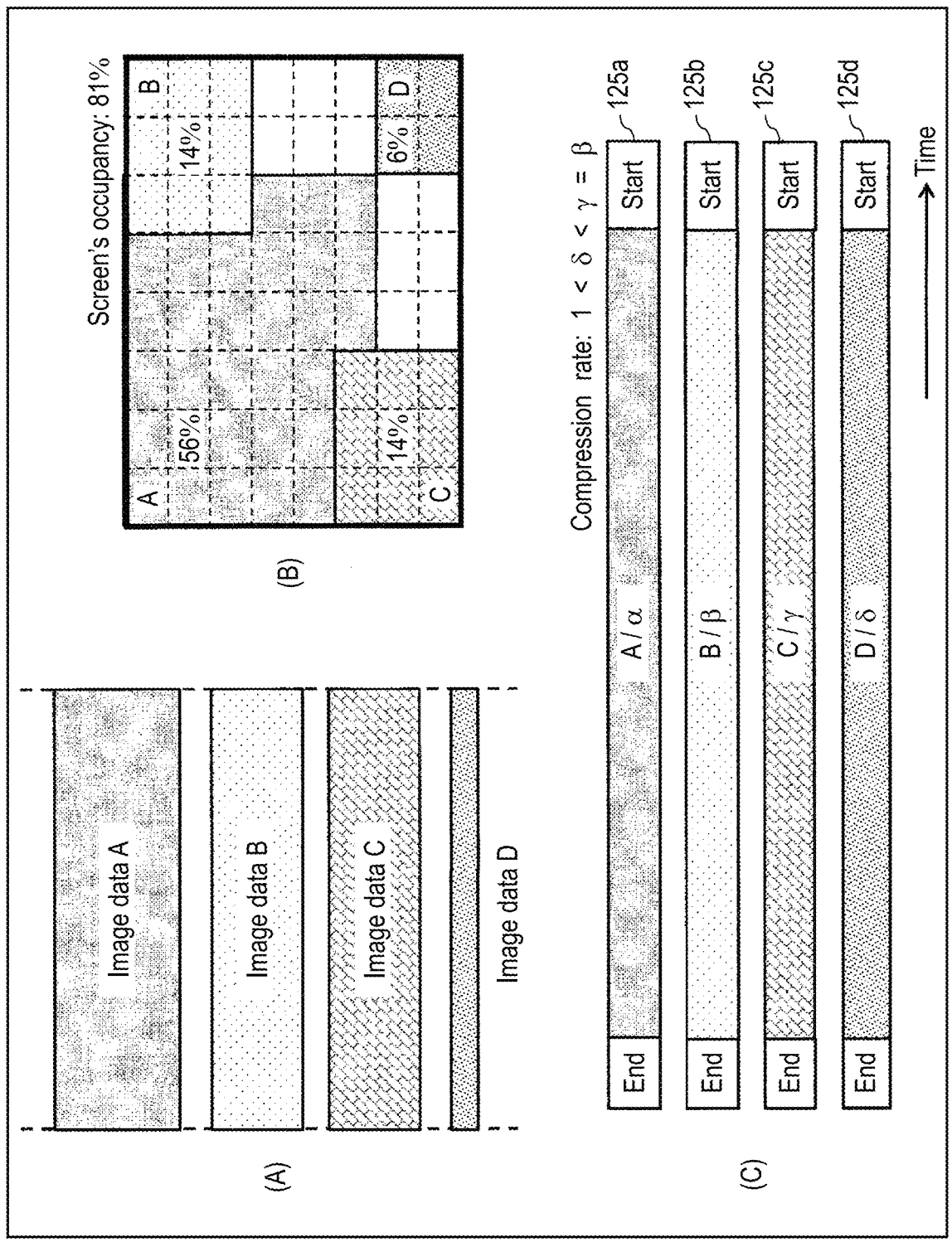
FIG. 8 is a diagram for describing the problem occurring when the compression rates of image signals are simply set different from each other.

When the data amounts of image data are unbalanced as shown in (B) of FIG. 5, the following two methods are considered as the data compression method. One method is a method of setting the compression rates of all windows at the same value, and the other is a method of setting the compression rates on a window-by-window basis. Referring to FIG. 7 and FIG. 8, problems included in these data compression methods are described.

Referring to FIG. 7, the example in which the compression rates of all windows are set at the same value is described. Diagram (A) of FIG. 7 schematically shows the data amounts of input image signals 112a to 112d. Diagram (B) of FIG. 7 shows the screen image when the estimated screen's occupancies are unbalanced, and this screen image is the same as that shown by (B) of FIG. 5. Diagram (C) of FIG. 7 schematically shows the use rates of the image data transmitted through first to fourth communication paths 125a to 125d.

In (A) of FIG. 7, window A has the highest screen's occupancy, and window D has the lowest screen's occupancy. The whole display screen has a size equivalent to 64 blocks. Therefore, when the whole image data is uniformly communicated through four communication paths 125a to 125d, the data amount transmitted through one path is 16 (=64/4) blocks. Therefore, regarding the screen shown in (A) of FIG. 7, in order to set the use rate of the data transmitted through one communication path to be 25% or less of the whole use rate, compression rate α is calculated by the following expression.

$$\alpha = \varepsilon1 \times (\text{number of blocks occupied by window} \quad (3a)$$
$$A \text{ having the highest screen's occupancy})/$$
$$(\text{number of blocks for one communication path in}$$
$$\text{uniform communication}) = \varepsilon1 \times (36/16)$$

When image signals are compressed at compression rate α determined by expression (3a), the use rate of the communication data for each of windows "A to D" in one communication path is calculated by the following expression.

$$\text{The use rate of communication data for each window} = (\text{number of blocks for each window}/\alpha)/64 \quad (3b)$$

Specific use rates for windows "A to D" are calculated using expression (3b).

$$\text{The use rate of communication data for window } A = \quad (4a)$$
$$\{(\text{number of blocks for window } A:36)/(36/16)\}/64 = 25.0\%$$

$$\text{The use rate of communication data for window } B = \quad (4b)$$
$$\{(\text{number of blocks for window } B:9)/(36/16)\}/64 = 6.3\%$$

$$\text{The use rate of communication data for window } C = \quad (4c)$$
$$\{(\text{number of blocks for window } C:9)/(36/16)\}/64 = 6.3\%$$

$$\text{The use rate of communication data for window } D = \quad (4d)$$
$$\{(\text{number of blocks for window } D:4)/(36/16)\}/64 = 2.8\%$$

Generally, a compression processing technology of image signals has the following characteristic:
  an image signal that has been compressed and decompressed by a compression circuit and decompression circuit does not completely coincide with the original image signal that is not compressed and not decompressed.

Therefore, when an image signal is repeatedly compressed and decompressed at a high compression rate and a high decompression rate, the image quality is apt to be degraded.

In other words, the operation in which all images are uniformly compressed and decompressed at compression rate α of window A having the highest screen's occupancy in all image signals means the following process:
  the images for window B, window C, and window D having lower screen's occupancies are also compressed and decompressed at high compression rate α.

In other words, the image data corresponding to each of windows "B to D" is compressed and decompressed at compression rate α higher than a compression rate essentially necessary for the communication through the corresponding communication path. Therefore, disadvantageously, the image qualities of windows "B to D" are further degraded.

Next, referring to FIG. 8, an example in which the compression rate is set on a window-by-window basis is described. In accordance with the screen's occupancies by the windows shown by expressions (2a) to (2d), compression rates α, β, γ, and δ of the windows set so that the use rate of the communication data for the image of each window is 25% or less are calculated by the following expressions.

$$\alpha = \quad (5a)$$
$$\varepsilon1 \times (\text{number of blocks in window } A)/(\text{number of blocks for one communication path}) = \varepsilon1 \times (36/16)$$

$$\beta = \quad (5b)$$
$$\varepsilon1 \times (\text{number of blocks in window } B)/(\text{number of blocks for one communication path}) = \varepsilon1 \times (9/16)$$

-continued $$\gamma = \varepsilon1 \times (\text{number of blocks in window } C)/(\text{number of blocks for one communication path}) = \varepsilon1 \times (9/16) \quad (5c)$$

$$\delta = \varepsilon1 \times (\text{number of blocks in window } D)/(\text{number of blocks for one communication path}) = \varepsilon1 \times (4/16) \quad (5d)$$

When data in the windows has been compressed at compression rates $\alpha$, $\beta$, $\gamma$, and $\delta$, data in the windows is compressed to the same data amount. Therefore, when data in the windows is compressed at compression rates $\alpha$, $\beta$, $\gamma$, and $\delta$, the use rates of the communication data passing through communication paths are calculated by the following expressions, and the use rates can be set at substantially the same value.

Use rate of communication data for window $A$=25% (=16/64) (6a)

Use rate of communication data for window $B$=25% (=16/64) (6b)

Use rate of communication data for window $C$=25% (=16/64) (6c)

Use rate of communication data for window $D$=25% (=16/64) (6d)

However, compression rates $\alpha$, $\beta$, $\gamma$, and $\delta$ of the windows have the following relation.

$$\alpha > \beta = \gamma > \delta > 1 \quad (7)$$

Thus, the compression rates are different from each other. For example, ratio $\alpha/\beta$ of the compression rate of window A to that of window B is 4. Ratio $\alpha/\gamma$ of the compression rate of window A to that of window C is 4. Ratio $\alpha/\delta$ of the compression rate of window A to that of window D is 9. Ratio $\beta/\gamma$ of the compression rate of window B to that of window C is 1. Ratio $\beta/\delta$ of the compression rate of window B to that of window D is 2.25. Ratio $\gamma/\delta$ of the compression rate of window C to that of window D is 2.25.

Therefore, when an image signal (for example, image signal 112a) compressed and decompressed at a high compression rate (for example, $\alpha$) and an image signal (for example, image signal 112d) compressed and decompressed at a low compression rate (for example, $\delta$) are displayed in an overlapping state on the same screen, the image quality is apt to change on the boundary in which the images overlap each other.

In other words, when images are compressed at different compression rates $\alpha$, $\beta$, $\gamma$, and $\delta$ in accordance with the screen's occupancies by the windows as shown in expression (7), and are transmitted, the following problem occurs: the compression rate significantly differs between window A and other windows B, C, and D, and hence the image quality significantly changes on the boundary in which a plurality of windows overlap each other.

Image signal processing device 2 of the present exemplary embodiment addresses the above-mentioned problems using the operation of path/compression-rate setting circuit 22.

[2-2. Operation of the Path/Compression-Rate Setting Circuit]

(1) Operation Example 1 of the Path/Compression-Rate Setting Circuit

Figure 9:
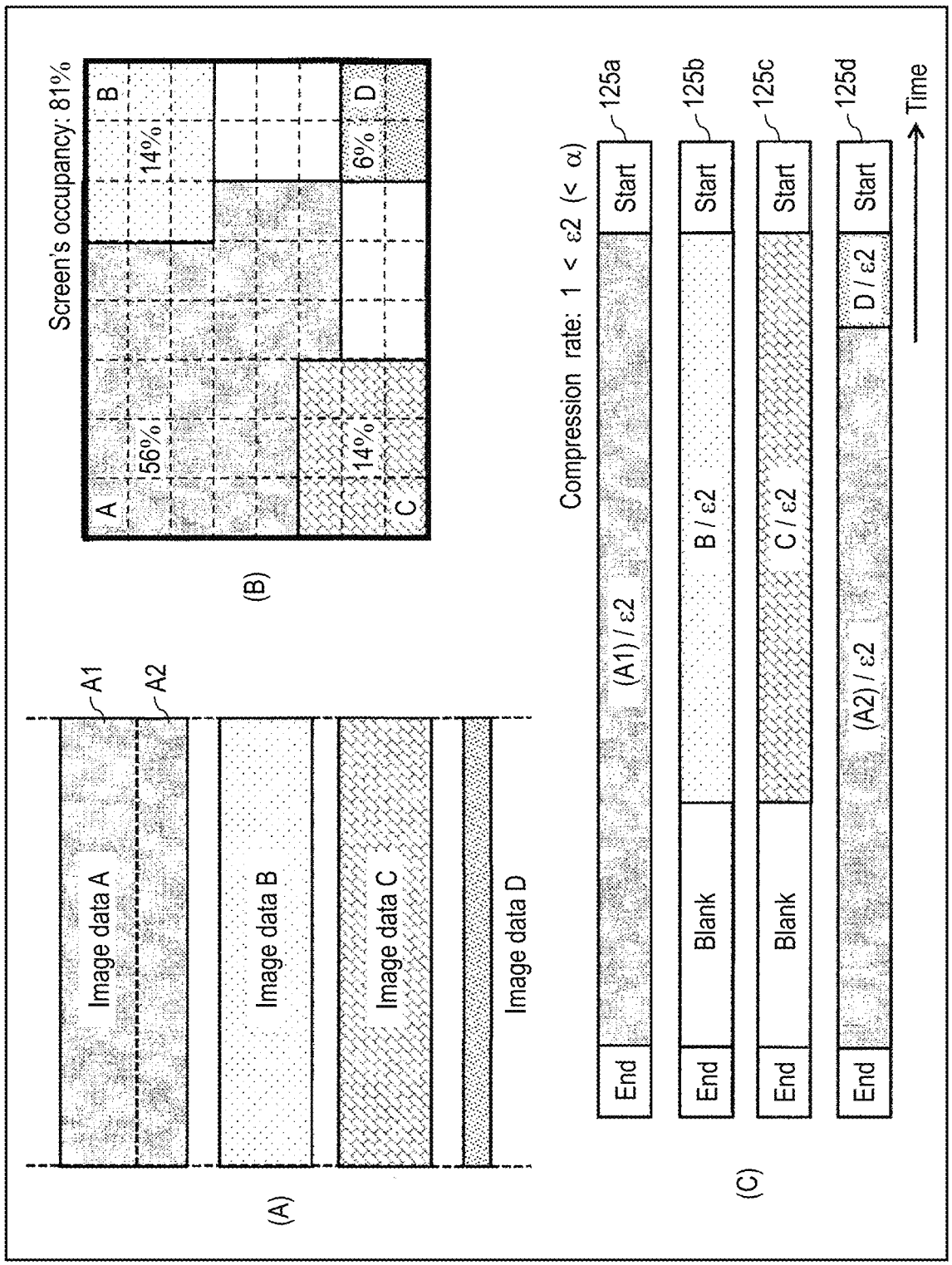
FIG. 9 is a diagram for describing the use rates of image data in the communication paths when an image signal having a high screen's occupancy is assigned to two communication paths.

Hereinafter, referring to FIG. 9, an operation of path/compression-rate setting circuit 22 in image signal processing device 2 is described. FIG. 9 is a diagram for describing the use rates of image data in the communication paths when an image signal of a high screen's occupancy is assigned to two communication paths. Diagram (A) of FIG. 9 schematically shows the data amounts of the input image signals, diagram (B) of FIG. 9 shows an example of the screen when the screen's occupancies are unbalanced, and diagram (C) of FIG. 9 schematically shows the use rates of image data transmitted through first to fourth communication paths.

In order to reduce the unbalance in the data use rates in communication paths 125a to 125d, path/compression-rate setting circuit 22 in image signal processing device 2 changes the data amount (number of blocks) assigned to each of communication paths 125a to 125d (namely, transmission paths 123a to 123d).

Specifically, path/compression-rate setting circuit 22 calculates the screen's occupancies by image signals 112a to 112d. On the basis of the screen's occupancies, path/compression-rate setting circuit 22 determines whether the data amounts transmitted through the communication paths, namely the screen's occupancies, are unbalanced. For example, path/compression-rate setting circuit 22 determines whether there are image signals between which the difference in screen's occupancy is a predetermined value or more. When there are image signals between which the difference in screen's occupancy is the predetermined value or more, the following operations are performed:

the data amounts, namely screen's occupancies, are determined to be unbalanced; and path/compression-rate setting circuit 22 assigns a part of the data of the image signal having a high screen's occupancy to communication path 125 (transmission path 123) for transmitting the image signal having a low screen's occupancy.

Thus, the unbalance in the data amounts transmitted through communication paths 125 (namely, transmission paths 123) is reduced, and the whole communication efficiency achieved when a uniform compression rate is applied to the image signals transmitted through the communication paths is improved.

For example, the case that the screen's occupancies are unbalanced as shown by expressions (2a) to (2c) is considered in the example shown by (B) of FIG. 5. A part (data A2) of image data A in window A having a high screen's occupancy is assigned to fourth transmission path 123d corresponding to window D having a low screen's occupancy so that the screen's occupancies have values shown by the following expressions. Thus, image data D in window D and data A2, which is a part of image data A in window A, are output to fourth communication path 125d (namely, fourth transmission path 123d). Furthermore, remaining data A1 of image data A in window A is output to first communication path 125a (namely, first transmission path 123a). At this time, the sizes of data A1 and data A2 are determined so that the data amount of the whole data finally assigned to first communication path 125a is equal to the data amount of the whole data finally assigned to fourth communication path 125d. By such an assignment, the screen's occupancies are calculated as below. Hereinafter, portions corresponding to data A1 and data A2 in window A are referred to as block A1 and block A2, and block A1 and block A2 in window A are referred to as window A1 and window A2.

$$\text{Screen's occupancy by window } A1 = 31\% (=20/64) \qquad (8a)$$

$$\text{Screen's occupancy by window } B = 14\% (=9/64) \qquad (8b)$$

$$\text{Screen's occupancy by window } C = 14\% (=9/64) \qquad (8c)$$

$$\text{Screen's occupancy by windows } D \text{ and } A2 = 31\% \\ (=20/64) \qquad (8d)$$

Using expressions (8a) to (8d), compression rate ε2 is determined so that the use rate of the communication data of block A1 having the highest screen's occupancy is 25% or less.

$$\varepsilon 2 = \varepsilon 1 \times (\text{the number of blocks in window } A1) / \qquad (9)$$
$$(\text{the number of blocks for one communication path}) =$$
$$\varepsilon 1 \times (20/16) = \varepsilon 1 \times 0.8$$

Since all windows are unfirmly compressed at compression rate ε2, even when a plurality of windows (images) are displayed in an overlapping state on the same screen, the compression rates of the windows are the same value and hence the change of the image quality on the boundary in which the images overlap each other is suppressed.

Furthermore, compression rate ε2 after path change can be set at a value lower than compression rate α determined by the above-mentioned method (see FIG. 7), so that the degradation of the image quality can be further suppressed.

(2) Operation Example 2 of the Path/Compression-Rate Setting Circuit

In the method described in operation example 1, data A2 as a part of image data A in window A having a high screen's occupancy is assigned to only fourth communication path 125d of window D having a low screen's occupancy. Therefore, the use rates of communication data in communication paths 125a to 125d are sometimes non-uniform as described below (see FIG. 9).

$$\text{Use rate of communication data for window} \\ A1 = 25\% (=16/64) \qquad (10a)$$

$$\text{Use rate of communication data for window} \\ B = 11.3\% (=7.2/64) \qquad (10b)$$

$$\text{Use rate of communication data for window} \\ C = 11.3\% (=7.2/64) \qquad (10c)$$

$$\text{Use rate of communication data for window } A2 \text{ and} \\ \text{window } D = 25\% (=16/64) \qquad (10d)$$

In other words, the use rates of communication data for windows B and C in communication paths 125b and 125c are lower than those for windows A and D in communication paths 125a and 125d. In other words, communication paths having a low communication efficiency exist.

Figure 10:
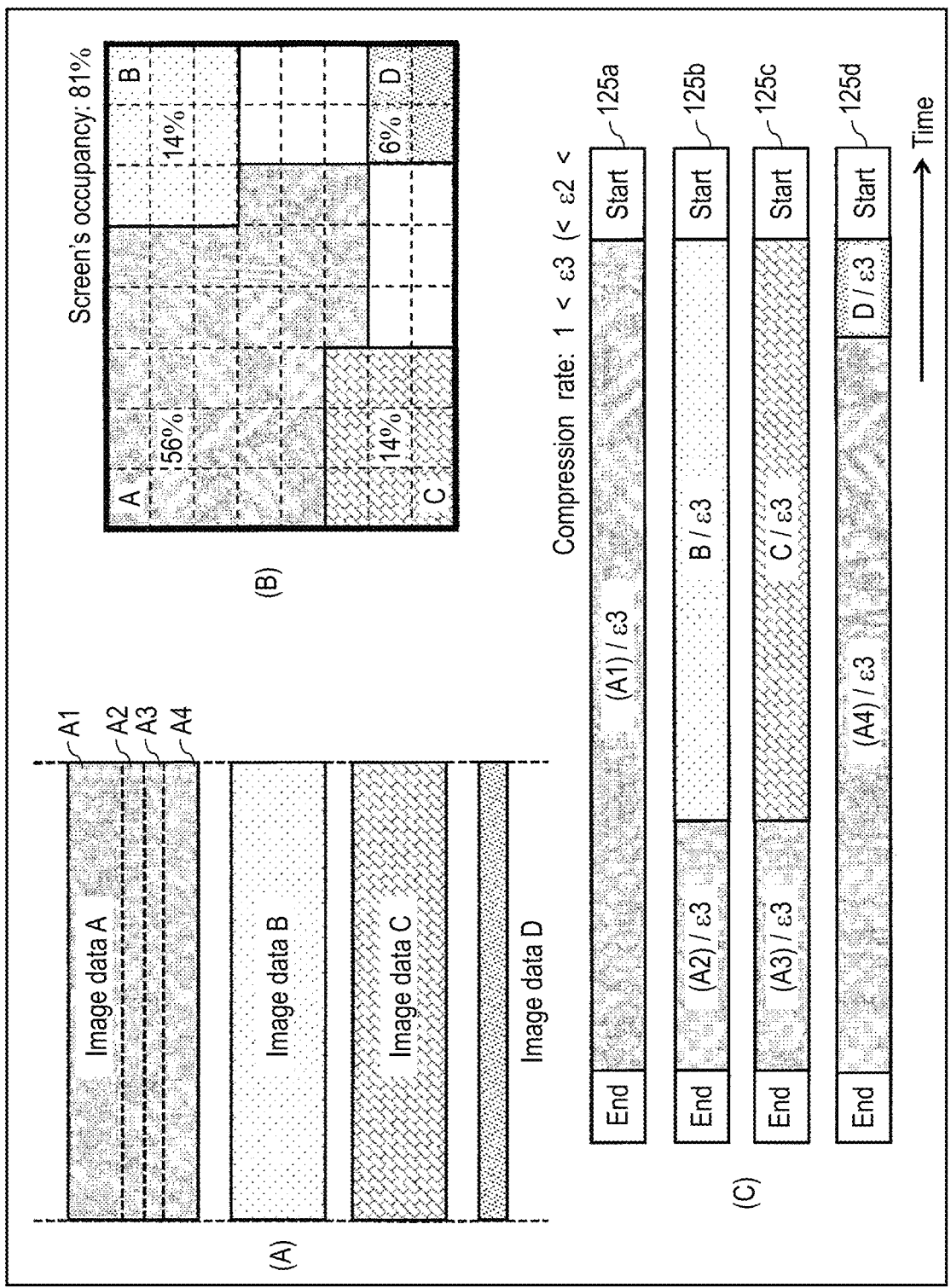
FIG. 10 is a diagram for describing the use rates of image data in the communication paths when an image signal is assigned to a plurality of communication paths so that the data use rates in the communication paths are constant.

Therefore, in order to further improve the whole communication efficiency, the following method may be employed: as shown in FIG. 10, path/compression-rate setting circuit 22 divides the window having a high screen's occupancy into a plurality of blocks so that the screen's occupancies by the windows in the transmission paths are uniform; and these blocks are assigned to communication paths (transmission paths) other than the communication path (namely, transmission path) for the window having the high screen's occupancy.

Specifically, image data A of window A is divided into data segments A1 to A4 corresponding to four blocks A1 to A4. Block A1 includes data corresponding to 14.5 blocks, each of blocks A2 and A3 includes data corresponding to 5.5 blocks, and block A4 includes data corresponding to 10.5 blocks. Path/compression-rate setting circuit 22 assigns the data in block A1 to first communication path 125a (first transmission path 123a) corresponding to window A. The data in block A2 is assigned to second communication path 125b (second transmission path 123b) corresponding to window B. The data in block A3 is assigned to third communication path 125c (third transmission path 123c) corresponding to window C. The data in block A4 is assigned to fourth communication path 125d (fourth transmission path 123d) corresponding to window D.

In this assignment, the data in block A1 (hereinafter referred to as "window A1") of window A is transmitted to first communication path 125a. The data in block A2 (hereinafter referred to as "window A2") of window A and the data in window B are transmitted to second communication path 125b. The data in block A3 (hereinafter referred to as "window A3") of window A and the data in window C are transmitted to third communication path 125c. The data in block A4 (hereinafter referred to as "window A4") of window A and the data in window D are transmitted to fourth communication path 125d. The screen's occupancies by the windows become uniform as below.

$$\text{Screen's occupancy by window } A1 = 23\% (=14.5/64) \qquad (11a)$$

$$\text{Screen's occupancy by windows } B \text{ and } A2 = 23\% (= \\ (9+5.5)/64) \qquad (11b)$$

$$\text{Screen's occupancy by windows } C \text{ and } A3 = 23\% (= \\ (9+5.5)/64) \qquad (11c)$$

$$\text{Screen's occupancy by windows } D \text{ and } A4 = 23\% (= \\ (4+10.5)/64) \qquad (11d)$$

When compression rate ε3 is determined so that the use rate of the communication data of each window is 25% or less, the following expression is obtained.

$$\varepsilon 3 = \varepsilon 1 \times (\text{number of blocks in window } A1) / \qquad (12)$$
$$(\text{number of blocks for one communication path}) = \varepsilon$$
$$1 \times (14.5/16)$$

According to expression (12), compression rate ε3 set for the example of FIG. 10 by path/compression-rate setting circuit 22 is lower than basic compression rate ε1 set when data amounts in four windows are balanced as shown in (A) of FIG. 5, FIG. 6A, and FIG. 6B. Therefore, the compression rate can be set lower than conventional compression rate α. As a result, an image signal processing device that suppresses the degradation of the image quality can be provided, and the communication efficiency can be also increased.

(3) Operation Example 3 of the Path/Compression-Rate Setting Circuit

Hereinafter, the operation of path/compression-rate setting circuit 22 performed when the screen's occupancies by windows have been changed is described. When at least one window has been expanded or reduced, path/compression-rate setting circuit 22 may set the compression rate on the basis of the screen's occupancy after the expansion or reduction.

Figure 11:
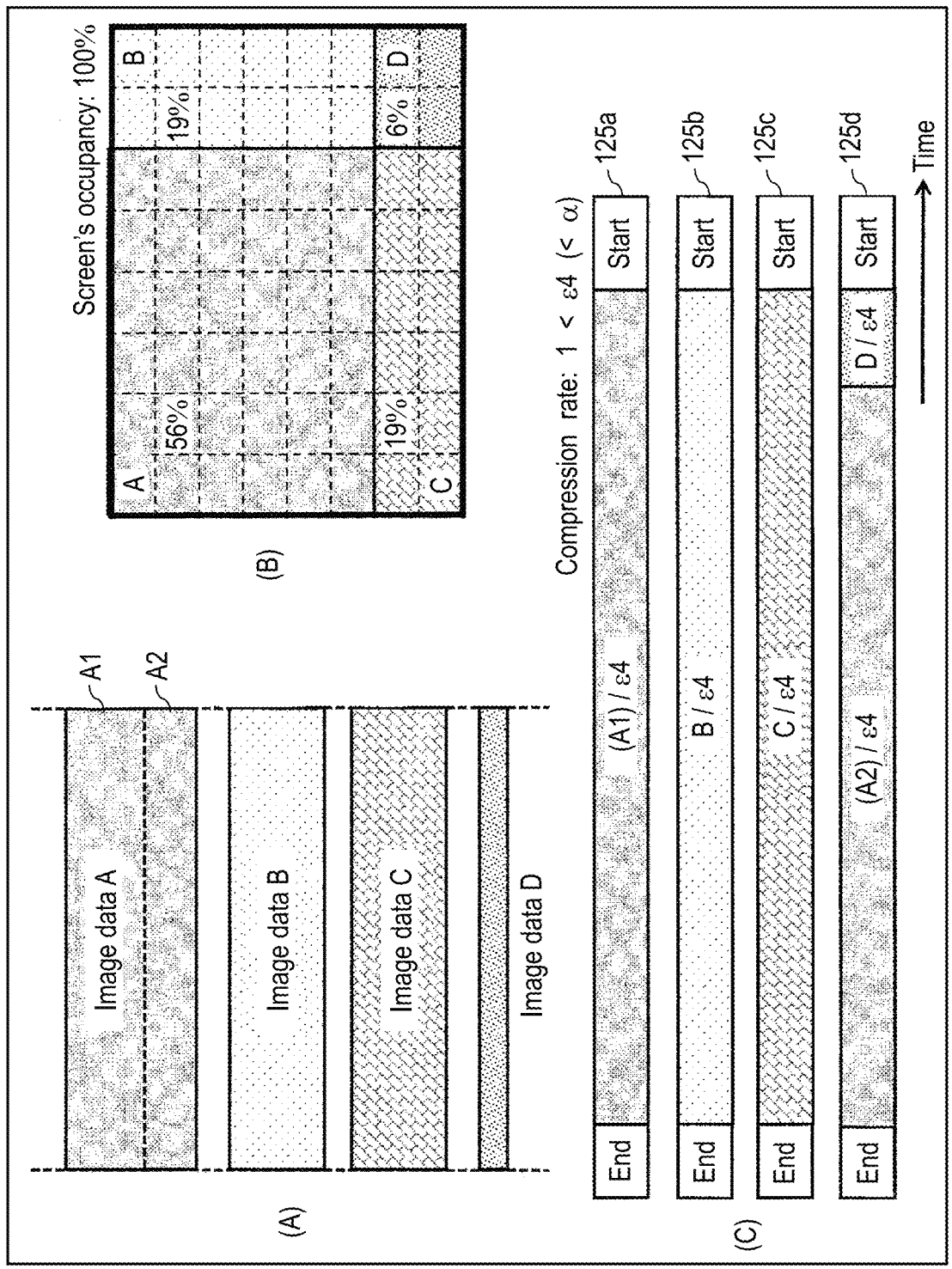
FIG. 11 is a diagram for describing the use rates of image data in the communication paths when the window size is changed.

Control device 10 performs display control such as expansion, reduction, and overlapping of windows "A to D" in accordance with control signal 101. In other words, the screen's occupancy by all windows after windows "A to D" are combined in accordance with control signal 101 can be also varied. Hereinafter, the operation performed when the screen layout shown in (B) of FIG. 9 is changed to the screen layout shown in (B) of FIG. 11 is described.

In the example shown in (B) of FIG. 9, the screen's occupancy by all windows are calculated by the following expression.

$$\text{Screen's occupancy by all windows} = 81\% (=52/64) \quad (13)$$

Windows B and C in the state shown in (B) of FIG. 9 are expanded in accordance with control signal 101 coming from control device 10, and the screen's occupancy by all windows increases from 81% to 100%. Also in this case, image data of each window needs to be transmitted at a limited band. Therefore, it is preferable to set the compression rate in consideration of the screen's occupancy after the change.

In the case shown in FIG. 11, compression rate ε4 is calculated using expression (9) and expression (13).

$$\varepsilon 4 = \varepsilon 2 \times \alpha \times \quad (14)$$

(number of blocks after assignment/number of blocks before assignment) ÷ (number of blocks in all windows)/

(number of displayable blocks) =

$\varepsilon 2 \times \alpha \times (20/36) \div (52/64) = \varepsilon 2 \times \alpha \times 0.68$ Also when the screen's occupancy by all windows arrives at 100%, namely the highest value, path/compression-rate setting circuit 22 performs the following processes:

determining the screen's occupancy by each window (image signal) and the screen's occupancy by all windows; and assigning a part of the data of an image signal having a high screen's occupancy to a transmission path for transmitting an image signal having a low screen's occupancy.

Thus, the unbalance in communication data amounts in the communication paths can be reduced.

Compressing each window at same compression rate (ε4) in such a manner produces the following advantage:

even when a plurality of images are displayed in an overlapping state on the same screen, the image quality hardly changes on the boundary in which the images overlap each other.

Furthermore, compression rate (ε4) set after the change of the transmission paths can be set lower than conventional compression rate α. Therefore, the degradation of the image quality can be suppressed.

[3. Advantage or the Like]

As discussed above, image signal processing device 2 of the present exemplary embodiment receives image signals from a plurality of source devices 1a to 1d, and outputs them via a plurality of communication paths 125a to 125d. Image signal processing device 2 includes the following components:

a plurality of compression circuits 23 that are disposed in a plurality of transmission paths 123a to 123d and compress image signals transmitted via the transmission paths;

transmission circuit 24 for outputting the image signals compressed by the compression circuits via the communication paths corresponding to the compression circuits; and path/compression-rate setting circuit 22 that, on the basis of the data amounts of the received image signals, determines a transmission path for transmitting a part or the whole of each image signal, and sets a common compression rate for all of compression circuits 23.

Path/compression-rate setting circuit 22 divides an image signal having a relatively large data amount, and assigns a part of the divided image signal to a transmission path for transmitting an image signal having a relatively small data amount.

In the above-mentioned configuration, compressing each image signal at the same compression rate produces the following advantage:

even when a plurality of windows (images) are displayed in an overlapping state on the same screen, the image quality hardly changes on the boundary in which the images overlap each other.

Furthermore, an image signal having a relatively large data amount is divided and assigned to a plurality of transmission paths. Thus, the common compression rate can be set at a value lower than compression rate (α) used in the case of no division, so that the degradation of the image quality can be further suppressed. In other words, an image signal transmission system can be provided which suppresses the degradation of images on the screen and the reduction in real time performance.

Path/compression-rate setting circuit 22 may assign data A1 as a part of the image signal having the largest data amount, of the received image signals, to one transmission path 123a. Simultaneously, path/compression-rate setting circuit 22 may perform the following processes:

further dividing the remaining part (data A2, data A3, and data A4) of the image signal having the largest data amount into one or more portions; and assigning them to one or more other transmission paths 123b, 123c, and 123d.

Thus, the unbalance in communication data amounts in the communication paths can be reduced.

Furthermore, path/compression-rate setting circuit 22 may divide the image signal having the largest data amount so that the data amount transmitted via one transmission path is substantially equal to the data amount transmitted via each of the other transmission paths. Thus, when the data transferred via each communication path is compressed at the same compression rate, more efficient data transfer is allowed.

When there is a divided and transmitted image signal (image signal whose path is changed), path/compression-rate setting circuit 22 may set the common compression rate at a value lower than the compression rate estimated when the image signal is not divided. Thus, the image degradation caused by the compression can be reduced.

Image signal transmission system 100 of the present exemplary embodiment includes the following components:
  image signal processing device 2; and
    receiving device 4 that receives image signals from image signal processing device 2 via network 3, generates a combined image on the basis of the received image signals, and transmits an image signal indicating the combined image to display device 5.
Receiving device 4 includes the following components:
  receiving circuit 41 for receiving image signals from transmission circuit 24;
  decompression circuits 42a to 42d for decompressing the received image signals; and
  image combining circuit 43 for combining the images indicated by the decompressed image signals.
When a divided and transmitted image signal exists, image combining circuit 43 returns the image signal to the state before the division, and performs image combining on the basis of the image signal after the return.

In image signal transmission system 100, transmission circuit 24 may transmit the following information—in addition to the compressed image signals—to receiving circuit 41:
  information indicating the decompression condition for decompressing the compressed image signals;
  assignment information indicating the assignment to transmission paths; and
  information indicating the combining condition of the image signals.
When a divided and transmitted image signal exists, image combining circuit 43 returns the image signal to the state before the division on the basis of the assignment information, and performs image combining on the basis of the combining condition.

Image signal transmission system 100 further may include control device 10 for supplying, to image signal processing device 2, a control signal for specifying the positions and overlapping of the images indicated by the image signals in a combined image. Thus, a user can set the positions and overlapping of the images indicated by the image signals in the combined image.

Receiving device 4 may include storage device 44 for storing the information that indicates the transmission paths set by path/compression-rate setting circuit 22 and the common compression rate. When the information indicating the paths and compression rate is temporarily stored in storage device 44, the information can be used by being read from storage device 44.

The image signals may be image signals including moving image data and/or image signals including still image data.

Another Exemplary Embodiment

As discussed above, the first exemplary embodiment has been described as an example of the technology disclosed by the present application. However, the technology disclosed by the present disclosure is not limited to this, and can be appropriately applied also to an exemplary embodiment having undergone modification, displacement, addition, or omission. A new exemplary embodiment may be produced by appropriately combining the configurations described by the first exemplary embodiment.

In the above-mentioned exemplary embodiment, the image size displayed on display device 5 is divided into 64 blocks. However, the number of blocks after the division is not limited to 64.

Furthermore, the number of source devices, the number of input circuits 21, the number of compression circuits 23, and the number of communication paths 125 are set at four, for example. However, these numbers are not limited to four, may be set at any number.

In the above-mentioned exemplary embodiment, path/compression-rate setting circuit 22 determines whether there is an unbalance in data amounts (namely, screen's occupancies) transmitted through the communication paths, on the basis of the difference between the screen's occupancies. Whether there is an unbalance in data amounts transmitted through the communication paths may be determined on the basis of another condition. For example, as the determination condition, it may be determined whether image signals between which the difference in screen's occupancy is a predetermined value or higher exist. Alternatively, on the basis of the data amounts transmitted by images—instead of the screen's occupancy—, the unbalance in data amounts (namely, screen's occupancies) transmitted through the communication paths may be determined.

Control device 10 may generate control signal 101 through real time control by a user, or may automatically generate control signal 101 in accordance with a previously determined program.

The number of compression circuits 23 does not need to be equal to the number of source devices. For example, a plurality of input image signals may be compressed by a single compression circuit. The number of decompression circuits 42 does not need to be equal to the number of source devices either. For example, a plurality of input image signals may be decompressed by a single decompression circuit.

Receiving device 4 and display device 5 may be integrally configured. Image signal processing device 2 and control device 10 may be integrally configured.

As discussed above, the exemplary embodiments have been described as examples of the technology in the present disclosure. For that purpose, the accompanying drawings and detailed descriptions have been provided.

Therefore, the components described in the accompanying drawings and detailed descriptions not only include components essential for addressing problems, but also, for exemplifying the technology, can include components that are not essential for addressing problems. Therefore, just because the nonessential components are described in the accompanying drawings and detailed descriptions, it doesn't necessarily mean that these nonessential components are recognized to be essential.

Furthermore, the above-mentioned exemplary embodiments are used for exemplifying the technology in the present disclosure. Therefore, within the scope of the claims or the equivalent scope, various modifications, displacements, additions, or omissions can be performed.

INDUSTRIAL APPLICABILITY

The present disclosure can be applied to a transmission system that receives image signals from a plurality of image sources and transmits them to a display device.

What is claimed is:

1. An image signal transmission system comprising:
an image signal processing device configured to receive image signals from a plurality of source devices and output image signals via a plurality of communication paths, the image signal processing device comprising:
- a plurality of compression circuits configured to compress image signals to be transmitted via the plurality of communication paths;
- a transmission circuit configured to output the image signals compressed by the plurality of compression circuits via the plurality of communication paths corresponding to the plurality of compression circuits; and
- a path/compression-rate setting circuit configured to, based on each data amount of the image signals received from the plurality of source devices, determine a communication path for transmitting a part or a whole of each of the image signals, of the plurality of communication paths, and set a common compression rate for all of the plurality of compression circuits,
- wherein the path/compression-rate setting circuit divides an image signal having a relatively large data amount out of the image signals, and assigns a part of the divided image signal to a communication path for transmitting an image signal having a relatively small data amount out of the image signals, of the plurality of communication paths; and a receiving device configured to receive the image signals from the image signal processing device via a network, generate a combined image based on the received image signals, and transmit an image signal indicating the combined image to a display device,
wherein the receiving device includes:
- a receiving circuit configured to receive the image signals from the transmission circuit of the image signal processing device via the plurality of communication paths;
- decompression circuits configured to decompress the received image signals; and
- an image combining circuit configured to combine images indicated by the decompressed image signals, and
wherein, when the decompressed image signals include parts of the image signal divided by the path/compression-rate setting circuit, the image combining circuit combines the parts back to the image signal, and combines the images using the combined image signal.

2. The image signal transmission system according to claim 1, wherein
the path/compression-rate setting circuit
assigns a part of an image signal having a largest data amount, of the image signals received from the plurality of source devices, to one communication path of the plurality of communication paths, and further divides a remaining part other than the part of the image signal having the largest data amount into one or more portions, and assigns the one or more portions to one or more other communication paths of the plurality of communication paths.

3. The image signal transmission system according to claim 2, wherein
the path/compression-rate setting circuit divides the image signal having the largest data amount so that a data amount transmitted via the one communication path is substantially equal to a data amount transmitted via each of the one or more other communication paths.

4. The image signal transmission system according to claim 2, wherein
when the image signals include an image signal to be divided to be transmitted, the path/compression-rate setting circuit sets the common compression rate to be lower than a compression rate set when the image signals does not include any image signal to be divided to be transmitted.

5. The image signal transmission system according to claim 1,
wherein, to the receiving circuit, the transmission circuit transmits:
- the image signals compressed by the plurality of compression circuits;
- information indicating an decompression condition for decompressing the compressed image signals;
- assignment information indicating an assignment of the image signals to the plurality of communication paths; and
- information indicating a combining condition for combining the images indicated by the decompressed image signals, and
wherein, when the decompressed image signals include the parts of the image signal divided, the image combining circuit combines the parts back to the image signal based on the assignment information, and combines the images using the combined image signal based on the combining condition.

6. The image signal transmission system according to claim 1, further comprising:
a control device configured to supply a control signal to the image signal processing device, the control signal specifying positions and overlapping of the images indicated by the image signals in the combined image.

7. The image signal transmission system according to claim 1, wherein
the receiving device includes a storage device configured to store the communication path set by the path/compression-rate setting circuit and the common compression rate.

8. The image signal transmission system according to claim 1, wherein
the image signals include at least one of moving image data and still image data.

* * * * *